United States Patent Office 3,647,692
Patented Mar. 7, 1972

3,647,692
NITROGEN-CONTAINING REACTION PRODUCTS AND THEIR USE IN LUBRICATING OILS AND FUELS
Richard J. Lee, Park Forest, Ill., assignor to Standard Oil Company, Chicago, Ill.
No Drawing. Filed Nov. 5, 1969, Ser. No. 874,396
Int. Cl. C10m 1/32; C10l 1/18, 1/22
U.S. Cl. 252—51.5 A        8 Claims

ABSTRACT OF THE DISCLOSURE

Oil-soluble compounds are prepared by heating a mixture comprising (a) a reduced nitro-nitrito alkane, containing at least ten carbon atoms, (b) an organic polybasic aliphatic or aromatic acid or anhydride, or long chain alkenyl substituted derivatives thereof, and (c) a polyalkylene amine, in the molar ratio of from about 1:1:0 to about 1:1:0.5, respectively; compounds so formed are useful additives in oleaginous compositions.

BACKGROUND OF THE INVENTION

It is known that the nitration of olefins, containing at least ten carbon atoms, with nitrogen tetraoxide or nitrogen dioxide, under non-oxidizing conditions, forms the corresponding nitro-nitrito alkanes; such nitro-nitrito alkanes, having at least ten carbon atoms, can be catalytically reduced by treatment with hydrogen. I have discovered that useful oil-soluble compounds are obtained by reacting, in the manner hereinafter described, such reduced nitro-nitrito alkanes with long chain alkenyl-substituted organic polybasic aliphatic or aromatic acids or anhydrides, in the presence or absence of small amounts of a polyalkylene amine.

SUMMARY OF THE INVENTION

In accordance with the present invention, useful oil-soluble compounds are obtained by heating at a temperature of from about 100° F. to about 400° F. a mixture comprising (a) the product obtained by catalytically reducing with hydrogen a nitro-nitrito alkane, containing at least about ten carbon atoms, (b) an organic polybasic aliphatic or aromatic acid or anhydride, or long chain alkenyl substituted derivatives thereof, and (c) a polyalkylene amine, in molar ratios of from about 1:1:0 to about 1:1:0.5. The reaction is suitably conducted in the presence of a non-reactive organic polar solvent, which is removed, after completion of the reaction, by suitable well-known means such as by distilling or stripping off the solvent, using a nitrogen purge if desired. Water-of-reaction is preferably removed by distillation under vacuum.

The polyalkylene amines, when used in the above reaction, are polyamines having the general formula

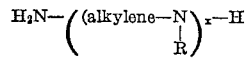

wherein $x$ is an integer of from 2 to about 10, R is hydrogen or a lower alkyl hydrocarbon substituent, and "alkylene" is a lower alkylene group, i.e., a divalent open-chain hydrocarbon group having from 1 to about 8 carbon atoms. Specific examples of such polyalkylene amines include: diethylene triamine, triethylene tetramine, tetraethylene pentamine, dipropylene triamine, tributylene tetramine, dimethylene triamine, pentamethylene hexamine, $N_1,N_3$-dimethyl diethylene triamine, tetraheptylene pentamine, trioctylene tetramine, etc.

The term "nitro-nitrito alkane" as used herein refers to the nitration product obtained by treating an alkene or a substantially aliphatic hydrocarbon containing at least about 10 carbon atoms and at least one ethylenically unsaturated site with nitrogen dioxide or nitrogens tetraoxide under non-oxidizing conditions at a temperature of from about 100° F. to about 250° F. until absorption of said nitrogen oxide ceases, as hereinafter described.

The reduced nitro-nitrito alkane product employed in the present invention is obtained as follows:

(a) Preparation of the nitro-nitrito alkane

The nitration of alkenes, or substantially olefinic hydrocarbons, to form nitro-nitrito alkanes is effected by treating such hydrocarbons, containing at least about ten carbon atoms, under non-oxidizing conditions with nitrogen tetraoxide, in an inert carrier gas, such as, for example, carbon dioxide or nitrogen, at a temperature of from about 100° F. to about 250° F. until absorption of the nitrogen tetraoxide ceases. The amount of nitrogen tetraoxide used will be about one mol per mol of unsaturation in the unsaturated material being nitrated. The nitration is preferably conducted in an inert solvent, such as, for example, an aliphatic or aromatic hydrocarbon solvent. Such nitration of alkenes is described in U.S. Pat No. 3,328,463 issued to R. J. Lee on June 27, 1967.

Any alkene, or substantially aliphatic hydrocarbons having at least one ethylenically unsaturated site, can be so nitrated. Such hydrocarbons include, for example, olefins and olefin polymers containing at least about ten carbon atoms, liquid petroleum oils, solvent extracted petroleum oils, etc.

Especially suitable hydrocarbons are mono- and polyalkenes, i.e., olefins of at least ten carbon atoms. Particularly suitable olefins are polymers of $C_2$ to $C_4$ monoolefins containing at least about 20 carbon atoms, preferably from about 30 to about 200, or more, carbon atoms, and molecular weights in the range of from about 300 to about 100,000. A particularly useful class of nitro-nitrito alkanes are those prepared from polypropenes and polybutenes having average molecular weights in the range of from about 300 to about 2,500.

(b) Reduction of the nitro-nitrito alkane

Reduction of the nitro-nitrito alkane is accomplished by subjecting such alkane to treatment with hydrogen at a pressure of from about atmospheric to about 5,000 pounds per square inch, in the presence of a hydrogenation catalyst, such as, for example, platinum, nickel, cobalt, etc. Temperatures in the range of from about 100° F. to about 600° F., preferably from about 250° F. to about 500° F. are employed. The reduction is desirably carried out in the presence of an inert solvent, such as, for example, hydrocarbon solvents such as hexane, cyclohexane, pentane, benzene, etc. The treatment with hydrogen is continued for a time sufficient to reduce substantially quantitatively the nitro-nitrito alkane.

The resultant reduced product is desirably washed with a virtually non-reactive polar solvent, for example, acetone, and/or a lower alkanol, such as methyl alcohol, and the washed product filtered by suitable well-known means. Any hydrocarbon solvent in the filtrate is removed by evaporation or distillation.

The long chain alkenyl-substituted organic polybasic acid or anhydride is readily prepared by reacting an unsaturated acid or anhydride with a long chain alkenyl hydrocarbon having at least 30 carbon atoms in the alkenyl substituent; methods for the preparation of such compounds are well-known in the art. Preferred long chain or high molecular weight alkenyl substituents are polymers of at least 30 carbon atoms of monoolefins having from 2 to about 12, preferably 2 to about 4 carbon atoms. Chlorinated derivatives of such polymers can also be used. Naturally occurring or synthesized long chain substantially aliphatic hydrocarbons of at least 30 carbon atoms are suitable. For example, a suitable polymer is the product obtained by the well-known process of polymerizing, in the liquid phase, a petroleum refinery hydrocarbon gas mixture containing butylenes and isobutylenes together with butanes and some $C_3$ to $C_5$ hydrocarbons in the presence of a Friedel-Crafts catalyst such as aluminum chloride, boron trifluoride, etc. As noted above, the alkenyl hydrocarbon substituent should contain at least about 30 carbon atoms, and preferably from about 50 to about 300 or more carbon atoms, and molecular weights in the range of from about 400 to about 100,000, suitably from about 400 to about 2,000.

Illustrative of suitable organic polybasic acids or anhydrides are: succinic acid, succinic anhydride, adipic acid, adipic anhydride, phthalic acid, phthalic anhydride, terephthalic acid, trimellitic acid, trimellitic anhydride, etc.

PREFERRED EMBODIMENT OF THE INVENTION

The following examples are illustrative of preferred embodiments of the present invention:

Example I (a) 1,000 grams of a phenol extracted SAE 40 petroleum oil was nitrated by blowing with nitrogen dioxide at 212–230° F. for eight hours.

(b) 500 grams of the nitrated solvent-extracted SAE 40 oil, prepared in (a) above, was reduced by treatment for 5½ hours with hydrogen at 400° F. and a pressure of 1,300 pounds per square inch in the presence of a 20% cobalt-on-pumice catalyst.

(c) 100 grams of the reduced product obtained in (b) above, was mixed with 200 grams of a 48% active polybutene-substituted succinic anhydride, in which the polybutene substituent had a molecular weight of about 890, and 10 grams of tetraethylene pentamine, and the mixture heated at 350° F. for ten hours. The reaction product was then freed of water-of-reaction by partial vacuum.

The recovered product, which contained 1.32% nitrogen, gave excellent carbon floatation values and a rating of 10 in the so-called RBRT test; demonstrating that the product exhibited excellent dispersancy and rust inhibiting properties. The RBRT test is carried out in the following manner: A sheet of .005 inch mild steel stock is abraded with #2 followed by #00 emery cloth and then with steel wool. Coupons 6" by 0.5" are cut from this sheet, wiped with a dry cloth, and immersed in one pint wide mouth bottles containing the test mixtures. The test mixtures consist of 250 cc. of the oil and inhibitor solutions, and 100 cc. of boiled distilled water. The bottles are covered with a Teflon sheet and a screw cap, rolled ten times horizontally to mix the contents, and allowed to stand upright for several days; in this manner portions of the specimen are exposed to the aqueous, oil, and vapor phases. The amount of rust which appears on the steel specimen in each phase is rated numerically from 0 to 10, the former indicating very heavy rusting, and the latter indicating the absence of rust.

A polybutene of about 890 average molecular weight was nitrated with $N_2O_4$ in a non-oxidizing atmosphere, to form a nitro-nitrito polybutane, and the nitrated product reduced by treatment with hydrogen in the presence of cobalt-on-pumice catalyst. The resultant reduced nitrated product was used in the following examples.

Example II 704 grams of the above reduced nitrated polybutene product and 150 grams of trimellitic anhydride were reacted at 270° F. in 700 grams of a SAE 5W petroleum oil for 12 hours. The reaction mixture was then treated with 40 grams of tetraethylene pentamine at 270° F. for 12 hours. The resultant product was freed of water and filtered.

The recovered filtrate exhibited excellent carbon floatation properties in the "Carbon Floatation Test," demonstrating its excellent dispersancy characteristics. The so-called "Carbon Floatation Test" is carried out by mixing a small amount of carbon with kerosene, adding a small quantity of the dispersing agent and noting the tendency of the carbon to fall out of the suspension.

Example III (a) 100 grams of the above reduced nitrated polybutene product and 11 grams of succinic anhydride (1:1 molar ratio) were mixed and heated at 240° F. for 12 hours.

(b) 100 grams of the above reduced nitrated polybutene product and 22 grams of trimellitic anhydride were heated together at 240° F. for 12 hours.

The recovered products of (a) and (b) were tested in the RBRT test, supra, with the following ratings:

|     | Rust | Rating |
| --- | --- | --- |
| (a) | 7.0 | 7.0 |
| (b) | 7.5 | 7.0 |

These results demonstrate the good rust inhibiting properties of the herein described products.

The herein described compounds of the present invention are useful as additives in hydrocarbon fuels and in oleaginous lubricant compositions to impart rust inhibiting and/or dispersancy properties thereto. The amounts used will normally range from about 0.01% to about 10%; the amount used in fuel compositions usually ranges from about 0.01% to about 1.0%, and in lubricant compositions from about 0.1% to about 10%. Suitable lubricating base oils are hydrocarbon, e.g., petroleum lubricating oils, synthetic lubricating oils such as those obtained by the polymerization of hydrocarbons, and other well-known synthetic lubricating oils.

Concentrates of a suitable oil base containing more than 10%, e.g., from about 15% to about 50% or more, of the compounds of the present invention, alone or in combination with other additives, can be used for blending with lubricating oils in proportions desired for particular conditions of use to give a finished product containing from about 0.1% to about 10% of the compound of the herein described invention.

Percentages given herein and in the appended claims are weight percentages unless otherwise stated.

While particular preferred embodiments of the present invention have been described, it is to be understood that the invention is not limited thereto, but includes such modifications and variations as come within the spirit and scope of the appended claims.

I claim:

1. The reaction product of the process comprising reacting (A) the product obtained by catalytically reducing a nitro-nitrito alkane containing at least about 10 carbon atoms with hydrogen, said nitro-nitrito alkane being the nitration product obtained by nitrating an alkene or a substantially aliphatic hydrocarbon containing at least about 10 carbon atoms and at least one ethylenically unsaturated site with nitrogen dioxide or nitrogen tetraoxide under non-oxidizing conditions at a temperature of from about 100° F. to about 250° F. until absorption of said nitrogen oxide ceases; (B) an organic acid compound selected from the group consisting of a polybasic aliphatic acid, a long chain alkenyl-substituted polybasic aliphatic acid in which the alkenyl substituent contains at least 30 carbon atoms, a polybasic aromatic acid and anhydrides of such acids; and (C) a polyalkylene polyamine; at a temperature of from about 100° F. to about 400° F.; said reactants being employed in molar ratios of from about 1:1:0 to about 1:1:0.5, respectively.

2. The product of claim 1 wherein said substantially aliphatic hydrocarbon is a solvent extracted petroleum oil; (B) is a long chain alkenyl-substituted succinic anhydride; and (C) is tetraethylene pentamine.

3. The product of claim 1 wherein said alkene is a polybutene having an average molecular weight in the range of from about 300 to about 2,500; and (B) is succinic anhydride.

4. The product of claim 1 wherein said alkene is a polybutene having an average molecular weight in the range of from about 300 to about 2,500; (B) is trimellitic anhydride; and (C) is tetraethylene pentamine.

5. An oleaginous composition, comprising a major proportion of a lubricating oil or a liquid hydrocarbon fuel and from about 0.01% to about 10% of the product of claim 1.

6. An oleaginous composition, comprising a major proportion of a lubricating oil or a liquid hydrocarbon fuel and from about 0.01% to about 10% of the product of claim 2.

7. An oleaginous composition, comprising a major proportion of a lubricating oil or a liquid hydrocarbon fuel and from about 0.01% to about 10% of the product of claim 3.

8. An oleaginous composition, comprising a major proportion of a lubricating oil or a liquid hydrocarbon fuel and from about 0.01% to about 10% of the product of claim 4.

References Cited

UNITED STATES PATENTS

| | | | |
|---|---|---|---|
| 2,956,953 | 10/1960 | Whitney | 252—51.5 R |
| 3,219,666 | 11/1965 | Norman et al. | 252—51.5 A |
| 3,307,928 | 3/1967 | Chaikivsky et al. | 44—63 |

DANIEL E. WYMAN, Primary Examiner

W. J. SHINE, Assistant Examiner

U.S. Cl. X.R.

44—63, 71; 252—51.5 R, 392; 260—326.5 F, 466